Feb. 21, 1967 T. E. BRAY 3,305,673

OPTOELECTRONIC COMPUTATIONAL DEVICES

Filed Jan. 15, 1963 6 Sheets-Sheet 1

FIG. I

INVENTOR:
THOMAS E. BRAY,
BY Marvin [signature]
HIS ATTORNEY.

INVENTOR:
THOMAS E. BRAY,
BY Marvin L. Goldenberg
HIS ATTORNEY.

Feb. 21, 1967 T. E. BRAY 3,305,673

OPTOELECTRONIC COMPUTATIONAL DEVICES

Filed Jan. 15, 1963 6 Sheets-Sheet 3

INVENTOR:
THOMAS E. BRAY,

BY Marvin L. Goldenberg
HIS ATTORNEY.

INVENTOR:
THOMAS E. BRAY,
BY Marvin L. Goldenberg
HIS ATTORNEY.

INVENTOR:
THOMAS E. BRAY,
BY Marvin L. Goldenberg
HIS ATTORNEY.

Feb. 21, 1967 T. E. BRAY 3,305,673

OPTOELECTRONIC COMPUTATIONAL DEVICES

Filed Jan. 15, 1963 6 Sheets-Sheet 6

INVENTOR:
THOMAS E. BRAY,

BY Marvin D. Goldenberg

HIS ATTORNEY.

though
United States Patent Office 3,305,673
Patented Feb. 21, 1967

3,305,673
OPTOELECTRONIC COMPUTATIONAL DEVICES
Thomas E. Bray, Clay, N.Y., assignor to General
Electric Company, a corporation of New York
Filed Jan. 15, 1963, Ser. No. 251,532
13 Claims. (Cl. 235—164)

This invention relates to digital computational devices and more particularly to novel optoelectronic computational devices which are small and inexpensive to fabricate. By the term optoelectronic it is meant having integrated electrical and optical properties, optoelectronic elements usually, although not exclusively referring to electroluminescent or photoconductor elements which are interconnected.

The devices of the present invention are particularly useful for performing such computations as addition, subtraction or multiplication of numbers in any conventional radix system.

The mechanical and electrical calculators of the prior art have not been found to be completely satisfactory for a number of reasons. Because of their complexity and the great multiplicity of individual components that are required, fabrication is not readily accomplished and the cost of these equipments is normally high. These limitations become all the more prominent when it is desired to fabricate small units. In addition, the electrical calculators require considerable amounts of power for their operation.

Accordingly, it is an object of the invention to provide novel digital computational devices that may be readily and inexpensively fabricated.

It is another object of the invention to provide novel computational devices that are readily fabricated into small, light weight equipments having low power requirements.

It is a further object of the invention to provide novel digital computational devices constructed primarily of optoelectronic components, which devices may be readily and inexepensively fabricated.

It is a further and more particular object of the invention to provide novel optoelectronic computational devices of the above characteristics for performing various calculations, such as addition, subtraction, or multiplication, with respect to numbers in essentially any radix system.

Briefly, these and other objects of the invention are accomplished in a novel optoelectronic computational device for performing certain mathematical calculations with respect to numbers in any conventional radix system, typically the decimal system. The device includes as a basic building block thereof a logic matrix of optoelectronic components having interconnected electroluminescent and photoconductor elements. The matrix comprises a grid arrangement of a first array of separate nonintersecting elements and a second array of separate nonintersecting elements which cross said first array at numerous crossover points. A first set of inputs are applied to said first array and a second set of inputs to said second array. In response to energization of a pair of crossing elements, which elements are selected in accordance with particular values of the applied input digits, an output is generated corresponding to the result of the mathematical operation being performed. Common output connections are made to outputs of equal value generated from different crossover points.

In accordance with a more specific aspect of the invention, addition or subtraction is performed wherein a single logic matrix is provided for each order of applied input digits. The first and second arrays may include a plurality of electroluminescent cells arranged as narrow strips, one for each digit of the applied order. The crossover points are optically coupled to a plurality of photoconductive means. In response to the energization of a pair of crossing electroluminescent cells by a pair of input signals, an output is provided from the associated photoconductive means, which output corresponds to the sum or difference, as the case may be, of the input digits. Common conductors are connected to the photoconductive means of equal valued outputs. The output may be coupled back to said second set of inputs so as to be added to subsequent digits applied to said first set of inputs. Circuitry is provided for maintaining a necessary isolation between the most recent output and the second input contributing thereto. When considering multi-order input numbers, there are provided a plurality of logic matrices, one for each order, which operate in parallel. In addition, circuitry is employed for generating and appropriately transmitting a carry signal to matrices of successive orders.

In accordance with another feature of the invention said first array of elements may include a plurality of electroluminescent cells and said second array a plurality of photoconductor cells, an output being produced only in response to energization of a pair of crossing photoconductor and electroluminescent cells.

In accordance with a further specific aspect of the invention, a novel optoelectronic computational device is provided for performing a multiplication of two numbers. In this device for each pair of digits to be multiplied there is provided a pair of logic matrices to each of which are applied said pair of digits. One of said matrices provides an output yielding the value of the right-hand component of the derived product, and the other of said matrices generates an output corresponding to the left-hand component of the product. The product logic matrices may be of similar construction to the addition-subtraction matrices above described except that the outputs, now representing product components, have a modified common coupling. For the multiplication of multi-order numbers a plurality of right-hand and left-hand product matrices are employed in suitable combination with addition matrices so as to provide a final output product.

The characteristics of the invention which are believed to be novel are set forth with particularity in the appended claims. The invention itself, however, both as to its organization and method of operation, together with further objects and advantages thereof may best be understood from the following description when taken in connection with the drawings, wherein:

Figure 1:
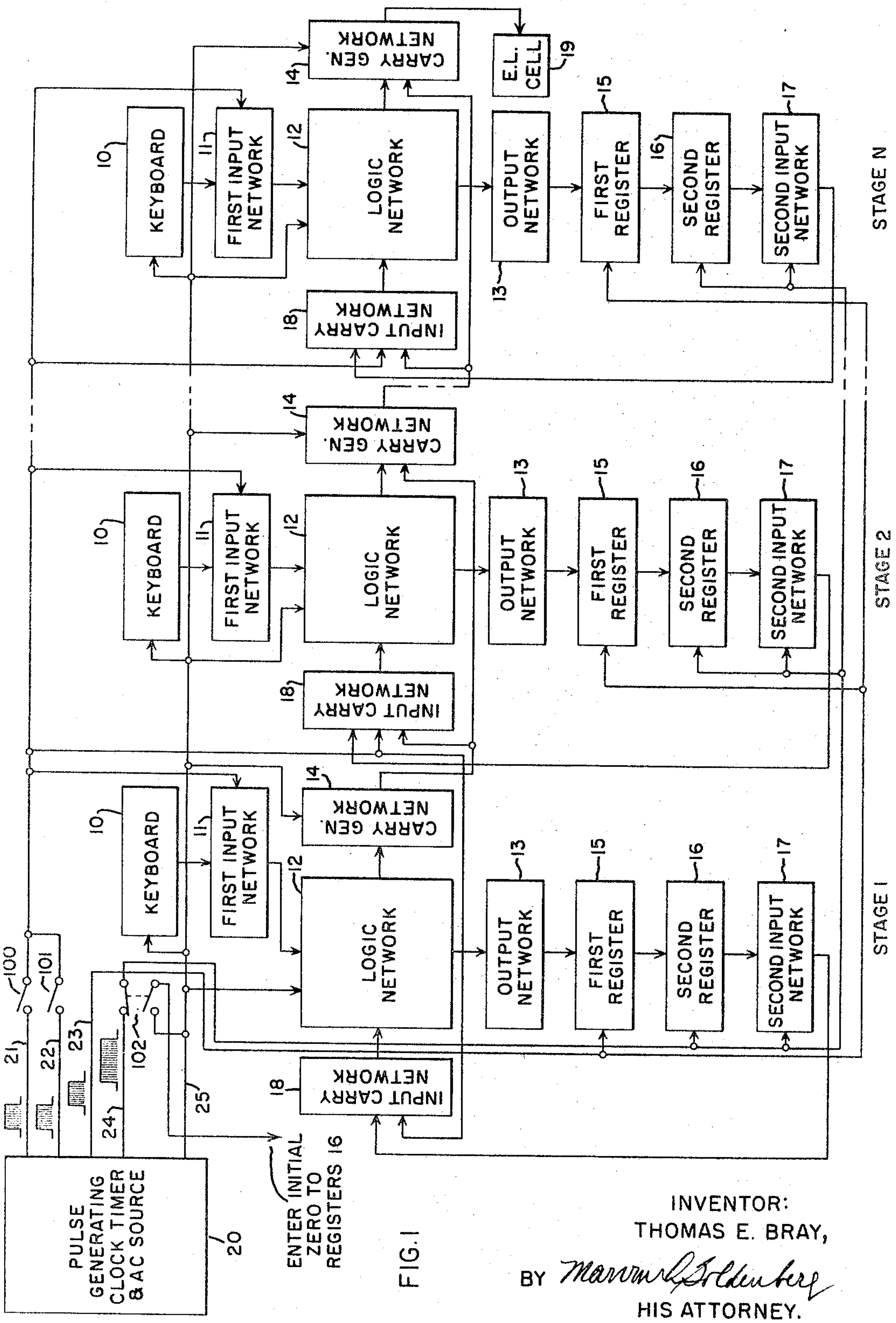
FIGURE 1 is a block diagram of a computational device in accordance with the invention for providing addition and subtraction of multi-order decimal numbers.

In FIGURE 1 there is diagrammatically illustrated in block form an optoelectronic computational device for performing addition or subtraction of multi-order numbers of the decimal system. Although the device shown is specifically related to the decimal system, it will be appreciated to have application with essentially any radix system. A first stage, second stage and nth stage of the computational device are illustrated. Each stage corresponds to and functions with a single order of the input numbers, the first stage being assigned to the lowest order and the succeeding stages to succeedingly higher orders with the *n*th stage corresponding to the highest order.

Each of the stages may include a keyboard 10 coupled to a first input network 11 which in turn is coupled as a first input to a logic matrix or network 12. Logic network 12 has a first output coupled to an output network 13 and a second output coupled to a carry generating network 14. The output network 13 is connected in series through a first register 15 and a second register 16 to a second input network 17. The output of the second input network 17 feeds through an input carry network 18 to the logic network 12 as a second input thereto. In all except the *n*th stage, the output from carry generating network 14 is connected both to the input carry network 18 and the carry generating network 14 of the succeding stage. The connection from network 14 to the succeeding input carry network 18 is for the purpose of advancing by one the second input applied to logic network 12 from second input network 17 when a carry is generated in the preceding stage. As is shown in greater detail in FIGURE 2, which more particularly illustrates a single stage of the device, the connection to the succeeding carry generating network 14 is for the purpose of expediting transmission of the carry signal for an (N–1), where N is the radix, output condition of the stage receiving the carry, in this case a "nine" output condition. The carry generating network 14 of the *n*th stage is coupled to an additional output indicator 19 for providing the next higher order of an output sum. In the first stage the input carry network 18 is employed in the subtract operation rather than to accept a carry signal from a previous stage, as will be explained subsequently.

A pulse generating clock timer and A.-C. source 20 provides energization to the various blocks of each stage in order to provide the proper sequential operation of these blocks. The clock timer 20 may be of a conventional type for performing timing operations, including, for example, a combination of blocking oscillators or multivibrators for gating an A.-C. generator. An A.-C. source is referred to because the phosphors of the electroluminescent cells are normally A.-C. responsive. It may be appreciated that for D.-C. responsive phosphors a D.-C. source is employed.

Figure 3:
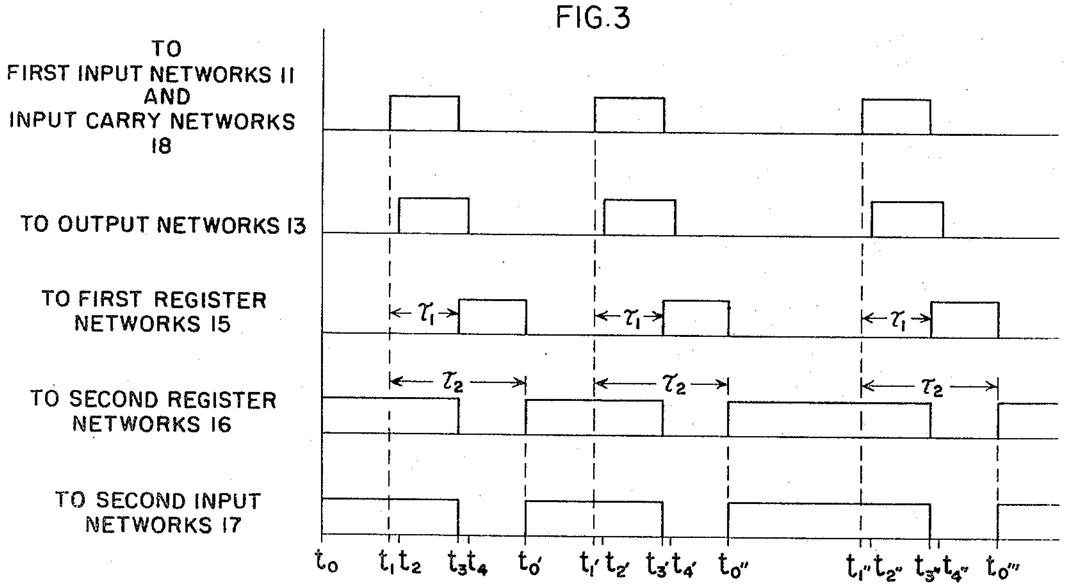
FIGURE 3 is a diagram indicating the timing sequence of the operations occurring in the system of FIGURE 1.

A first output 21 of network 20 is connected through an ADD switch 100 to provide an A.-C. pulse to first input networks 11 and to input carry networks 18; a second output 22 is connected through a SUBTRACT switch 101 to provide a second A.-C. pulse to first input networks 11 and to input carry networks 18; a third output 23 is connected to provide a third, delayed A.-C. pulse to first registers 15; a fourth output 24 is connected through a first contact of CLEAR switch 102 to provide a fourth, delayed A.-C. pulse to second registers 16 and second input networks 17; and a fifth output 25 is connected to provide continuous A.-C. energy to keyboards 10, logic networks 12 and carry generating networks 14. A tap is taken from output 25 which is connected through a second contact of switch 102 for entering an initial zero to registers 16. The timing of the various pulses is indicated in FIGURE 3 and will be discussed in more detail presently.

Before initiating an addition or subtraction operation, the second registers 16 of each stage are first cleared and a "zero" input entered into the registers 16. This is done, for example, by actuating the CLEAR switch

Figure 2:
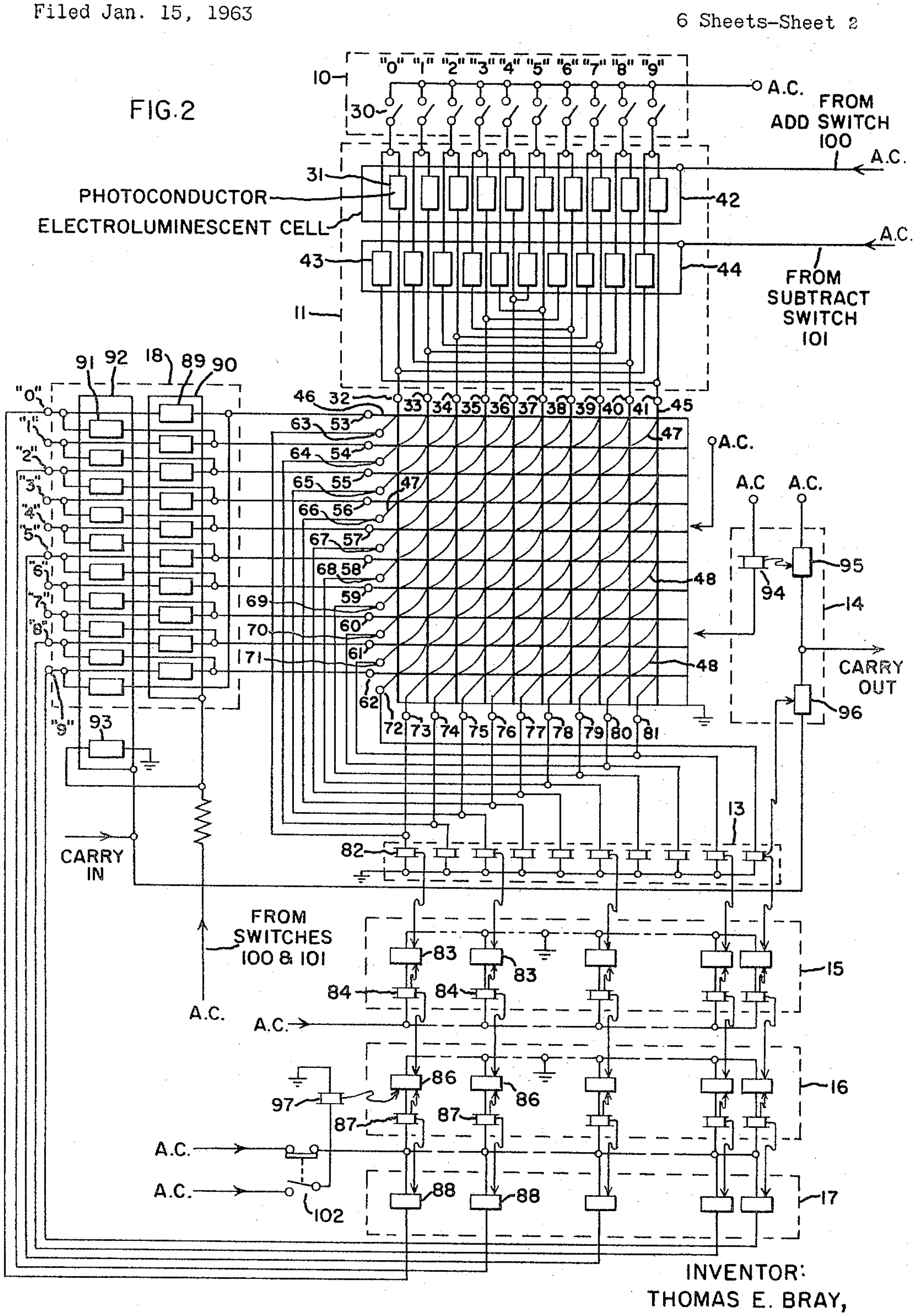
FIGURE 2 is a detailed schematic illustration of a single stage of the device shown in FIGURE 1.

102 which momentarily interrupts power to registers 16 and then energizes the zero position of registers 16, as shown in FIGURE 2. The keyboards 10 are next actuated by closing the appropriate switch in each keyboard designating the selected digits zero to nine to be entered. The keyboard switches are shown in FIGURE 2. For purposes of this description we will first consider the process of addition. Let it be assumed that it is desired to add the following numbers: 35,017 and 84,926. Thus, the switches corresponding to a seven, one and three are initially closed in keyboards 10 of the first, second and fifth stages, respectively. If for purposes of discussion the described device is considered to have five stages then stage *n* becomes the fifth stage. Next the ADD switch 100 is closed which activates first input networks 11 and input carry networks 18 for applying the input numbers to the proper corresponding input connections of logic networks 12. In each logic network 12 the first input from network 11 is added to the zero input from second input network 17 to provide an output in output network 13. In this case the output number is the same as that of the first input. As indicated by the timing sequence in FIGURE 3, the output appears slightly delayed from the input due to the inherent delay of the photoconductor cells of network 12. After a delay designated as $\tau_1$, the outputs from output networks 13 are shifted to registers 15. After a second delay, designated as $\tau_2$, the information in registers 15 is shifted into register 16 and second input networks 17. As shown in the timing sequence of FIGURE 3, during delay $\tau_2$ the previously applied inputs to each logic network 12 and the outputs therefrom have been termined.

It may be noted that registers 15 and 16 are required only in applications where the output of logic network 12 is reapplied as a second input for subsequent mathematical operations. In such applications registers 15 and 16 provide isolation between the output networks 13 and second input networks 17. However, if the output from network 13 is to be coupled to another component for subsequent processing, e.g., to another logic network or a memory network as in a computer system, these registers are not employed. In addition, keyboards 10 may not be required in such application.

In the next sequence of the operation the subsequent input, in this example the number 84,926, is punched into the keyboards 10. Upon closing the ADD switch 100, the various orders of this number are added to the corresponding orders of the previous output number in the respective logic matrices 12 of the various stages. Accordingly, in the first stage, the digit six is added to the previous output, now the second input seven. Since the resulting sum is greater than nine, two outputs are generated. One, representing the digit three, is coupled to output network 13 and the second, representing a carry one, is generated in carry generating network 14 and coupled to input carry network 18 of the second stage. In the second stage the first input digit two is added to the second input digit one which is advanced one by the carry applied to input carry network 18 and entered in matrix 12 as a two to provide an output of four to output network 13. No carry is generated by this sum. In the *n*th stage, now being considered as the fifth stage, the first input digid eight is added to the second input digit three to provide an output of one and a carry one. The carry one is coupled to indicator 19. Additional numbers may be added in similar manner. The final summated output may be held in registers 16 of the various stages and used to provide an indication of the result, or for any desired application.

For subtraction, the first input networks 11 enters the subtrahend into logic networks 12 and the second input networks 17 enter the minuend. The operation is similar to that described above except that now the SUBTRACT switch 101 is actuated to initiate operation which applies the (N–1's) complement of the number from the keyboard 10, N being the radix 10, and applies in effect a carry one to the input carry network 18 of the first stage only. Further, any output response in indicator 19 is utilized for a subtraction operation.

Referring now to the detailed schematic diagram of FIGURE 2, keyboard 10 comprises a plurality of switches 30, each switch corresponding to and entering a different value of input digits zero to nine, when considering a decimal radix system. The switches 30, as well as switches 100 to 102, are shown as mechanical switches in simplest form, for purposes of illustration. They may also assume other forms including the touch sensitive switch disclosed in copending application entitled "Touch Sensitive Opto-electronic Circuits and Indicator," S.N. 132,178, filed August 17, 1961 and assigned to the assignee of the present invention. Switches 30 are each coupled through separate photoconductor elements 31 directly to associated first input terminals 32, 33, 34, 35, 36, 37, 38, 39, 40 and 41 which correspond, respectively, to input digits zero to nine. In conventional fashion, the photoconductors in the present circuitry are operated discretely in either a high or a low impedance state in response to a light input or the absence thereof. They therefore act essentially as switches. Photoconductors 31 are optically coupled to electroluminescent cell 42 which is energized by an A.-C. pulse during the addition operation by actuation of ADD switch 100 to place photoconductors 31 in a low impedance state and thereby provide a direct connection between switches 30 and their associated input terminals of network 12. Switches 30 are also coupled through separate photoconductor elements 43, which are optically coupled to electroluminescent cell 44. Elements 43 connect switches 30 to the nine's complement input terminals of logic network 12 during the subtract process in which electroluminescent cell 44 is energized by an A.-C. pulse in response to actuation of SUBTRACT switch 101. Thus, for a subtraction operation, the switch 30 entering a zero is connected to nine terminal 41 of network 12; the switch entering a one is connected to eight terminal 40, etc.

Logic network 12 comprises a first array of nonintersecting elements 45 coupled to input terminals 32 to 41, and a second array of nonintersecting elements 46 coupled to second input terminals 53, 54, 55, 56, 57, 58, 59, 60, 61, and 62, corresponding respectively, to second input digits zero to nine. Elements 45 of said first array are disposed so as to cross over elements 46 of said second array, the crossover points being coupled to output conductors 47 and 48, shown as diagonals, which connect together outputs of equal value. Diagonal conductors 47 are coupled to output terminals 63, 64, 65, 66, 67, 68, 69, 70, 71 and 72, corresponding, respectively, to output values of zero to nine. Conductors 47 provide outputs for sums having no carry. Diagonal conductors 48 are coupled to output terminals 73, 74, 75, 76, 77, 78, 79, 80 and 81, corresponding, respectively, to output values of zero to eight. Conductors 48 provide outputs for sums that have a carry, as will be explained in greater detail subsequently.

Figure 4:
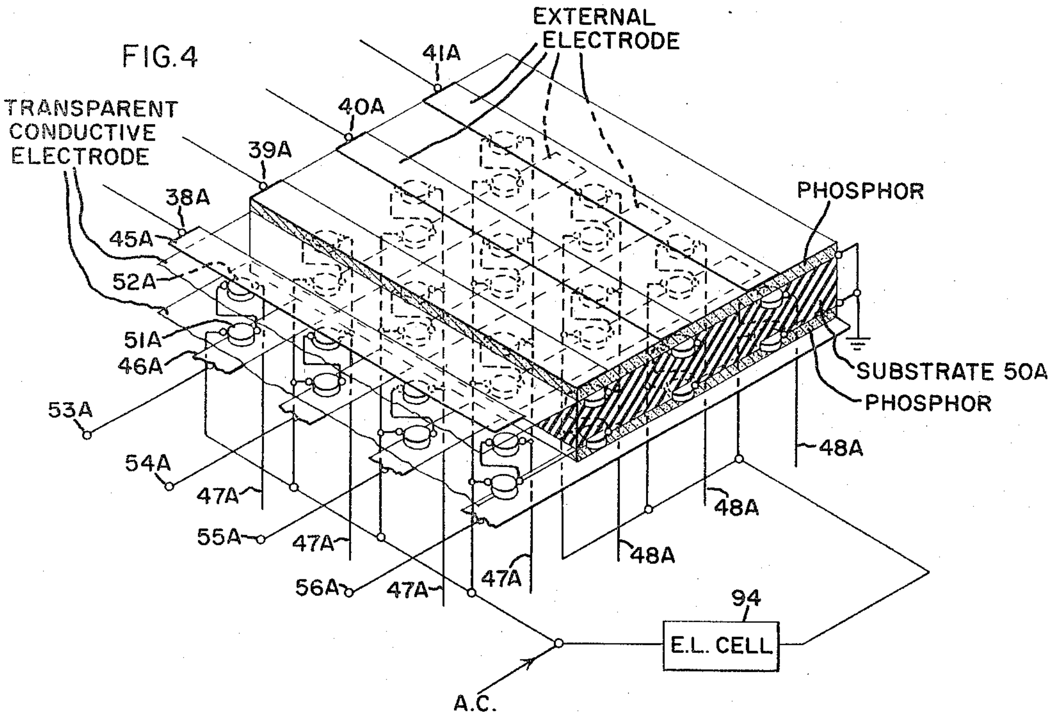
FIGURE 4 is a perspective view of a portion of the logic network shown in FIGURE 2 illustrating one form of construction that may be employed in said network.

In one exemplary embodiment of the invention, said first and second arrays comprise electroluminescent elements, in the form of strips, which are optically coupled at the crossover points to a pair of serially connected photoconductor elements. Such a construction is illustrated in a perspective view in FIGURE 4, which presents a portion of network 12, i.e., the upper right-hand corner. Thus, in FIGURE 4 there are shown input terminals 38A through 41A and 53A through 56A connected, respectively, to electroluminescent strips 45A and 46A, the same reference characters being employed in FIGURE 4 as in FIGURE 2 for corresponding elements, but with an added A notation. The electroluminescent strips are in a three layer construction. In one suitable construction, a continuous layer transparent electrode is deposited on the surface of a substrate 50A. Overlaying the transparent electrode is a continuous layer phosphor, and deposited thereon are external electrode strips. Photoconductor elements 51A and 52A, arranged in pairs, are placed between the transparent electrodes of the electroluminescent strips, but electrically insulated therefrom, and the substrate 50A, one on either side of the substrate at the region of crossover. Elements 51A are optically coupled to electroluminescent strips 46A and elements 52A are optically coupled to electroluminescent strips 45A. Connections are made through the substrate 50A between the output electrodes of photoconductors 51A and the input electrodes of associated photoconductors 52A. The output electrodes of elements 52A which provide an output sum without a carry, located in the upper left-hand portion of the matrix 12 in FIGURE 2, are connected in groups deriving outputs of equal value to conductors 47A, as shown in FIGURE 4. A common input connection is made to the input electrodes of the elements 51A associated with conductors 47A for energization by A.-C. power coupled directly from clock timer circuit 20. The output electrodes of elements 52A providing an output sum with a carry, located in the lower right-hand portion of matrix 12, are connected in groups deriving outputs of equal value to conductors 48A. A common input connection is made to the input electrodes of the elements 51A associated with conductors 48A for A.-C. energization coupled from circuit 20 through an electroluminescent cell 94 of carry generating network 14. In response to energization of a pair of crossing electroluminescent elements 45A and 46A, the associated pair of optically coupled photoconductor elements 51A and 52A are triggered into their low impedance state and provide an output through the diagonal conductor connected thereto. For the condition in which those elements 51A and 52A which are coupled to conductor 48A are triggered, it may be seen that electroluminescent cell 94 is energized to provide a carry signal.

Figure 5:
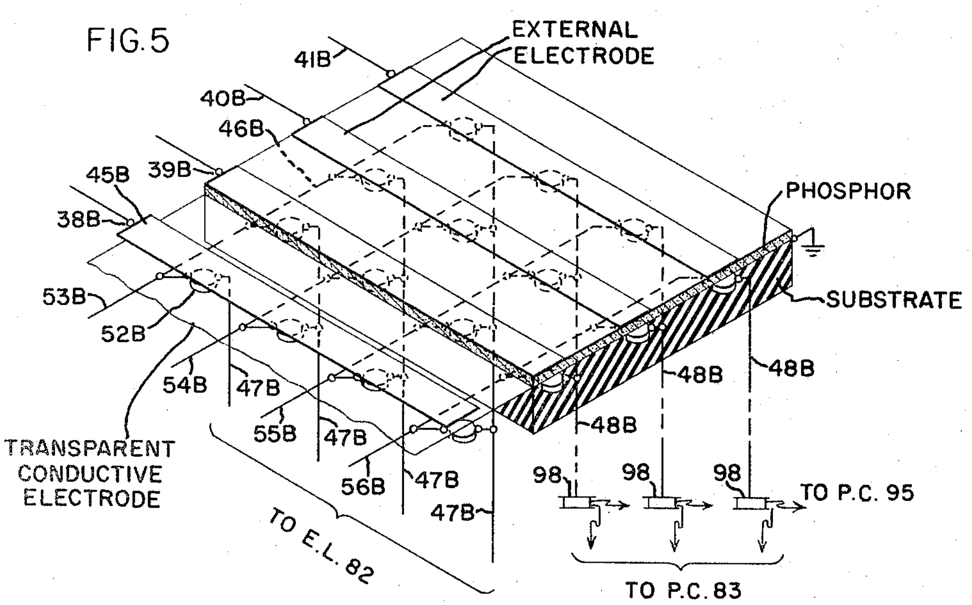
FIGURE 5 is a perspective view of another form of construction that may be employed in the logic network of FIGURE 2.

An alternative construction of logic network 12 is indicated in FIGURE 5 and will be described presently.

Referring again to FIGURE 2, the output terminals 63 to 71 and 73 to 81 of logic network 12 are respectively joined and connected to the input electrodes of corresponding electroluminescent cells 82 of output network 13 which cells correspond to output sums zero to eight. Output terminal 72 is connected to the input electrode of the cell 82 which corresponds to output sum nine. The output electrodes of cells 82 are connected in common to ground. Thus, for a given output from logic network 12 one of the electroluminescent cells 82, corresponding to said given output, is energized. Cells 82 are each optically coupled to an associated photoconductor element 83 of first register network 15. Photoconductor elements 83 have their output electrodes connected to ground. Connected in series with the input electrodes of each of said photoconductor elements 83, and optically coupled thereto, are electroluminescent cells 84. Cells 84 are energized by an A.-C. pulse from clock timer 20, the leading edge of said pulse being delayed by $\tau_1$ from the leading edge of the addition-subtraction pulses. The delay $\tau_1$, shown in FIGURE 3, should exceed the time required for the information in output network 13 to become stable and for convenience is made equal to the pulse width of said addition-subtraction pulses. Accordingly, information from output network 13 is shifted into first register network 15 with a delay of $\tau_1$ by means of the appropriate photoconductor element 83 being triggered from the associated electroluminescent cell 82. Element 83 remains locked on by its series connected electroluminescent cell 84 until expiration of the energizing A.-C. pulse.

Electroluminescent cells 84 are also optically coupled to associated photoconductor elements 86 of second register network 16 for shifting the information from register 15 to register 16. Register network 16 is of similar construction to register network 15, with the output electrodes of photoconductor elements 86 grounded and a plurality of electroluminescent cells 87 serially connected to the input electrodes of elements 86 and optically coupled thereto. In addition, an electroluminescent cell 97 energized through the second contacts of CLEAR switch 102, is optically coupled to the zero photoconductor element 86 for entering a zero during the clearing step. A delayed A.-C. pulse from clock timer 20, the leading edge thereof being delayed by $\tau_2$ from the leading edge of the addition-substraction pulses, provides energization for electroluminescent cells 87. Cells 87 are also optically coupled to associated photoconductor elements 88 of input network 17. The input electrodes of photoconductor elements 88 are also connected to the delayed A.-C. pulse from the clock timer circuit 20 that is coupled to cells 87 and the outputs thereof are coupled through input carry network 18 to the input electrodes 53 to 62 of logic network 12.

A plurality of photoconductor elements 89 optically coupled by an electroluminescent cell 90 provide a direct connection from photoconductor elements 88 of input network 17 to corresponding second input terminals of logic network 12. Electroluminescent cell 90 is energized by an A.-C. pulse in response to an actuation of the ADD switch 100 or SUBTRACT switch 101, as the case may be. It is noted, therefore, that in all but the first stage electroluminescent cell 90 is energized by actuation of either of switches 100 or 101. In the first stage only ADD switch 100 provides energization to cell 90 and SUBTRACT switch 101 energizes electroluminescent cell 92. A plurality of photoconductor elements 91 optically coupled by electroluminescent cell 92 connect the photoconductor elements 88 of input network 17 to second input terminals of logic network 12 which are advanced by one from the corresponding inputs, for providing the carry function. In all but the first stage electroluminescent cell 92 is energized by a carry signal from carry generating network 14 of the preceding stage. An addition photoconductor element 93 is also optically coupled to electroluminescent cell 92 and electrically connected to the A.-C. line energizing electroluminescent cell 90 for shunting power from and inactivating electroluminescent cell 90 during the period that electroluminescent cell 92 is energized.

Considering now network 14, a carry is generated when the crossovers associated with conductors 48 are energized. This causes electroluminescent cell 94 to become energized, as has been described with respect to FIGURE 4. Electroluminescent cell 94 is optically coupled to a photoconductor element 95 and in response to energization of cell 94 triggers element 95 to its low impedance state. Continuous A.-C. energy from circuit 20 is coupled to the input electrode of element 95, the output electrode thereof being connected to the succeeding stage so as to provide a carry signal thereto. Connected with its output electrode joined to that of the photoconductor element 95 is a second photoconductor element 96 optically coupled to the nine electroluminescent cell 82 of output network 13. The input electrode of element 96 is connected to carry input signal from the preceding stage so that element 96 expedites transfer of the carry signal for a nine output condition of network 13.

Considering the operation of the circuit of FIGURE 2, the CLEAR switch 102 is first depressed which momentarily interrupts power to second register 16 by the opening of the first contacts of the switch. Concurrently through the closing of the second contacts, electroluminescent cell 97 is energized for triggering the zero photoconductor 86 of register 16 into its low impedance state. Upon release of switch 102 an A.-C. pulse is applied from output 24 of clock timer 20 for energizing the zero electroluminescent cell 87 of register 16 which registers the zero, the triggered photoconductor remaining in a low impedance state, due to its characteristic finite decay time, during the time required to apply the A.-C. pulse. The pulse from output 24, which also energizes second input network 17, is shown to be applied at time $t_0$ in FIGURE 3. Let it be assumed that a three is then entered into keyboard 10. Accordingly, the switch 30 corresponding to the digit three is closed. The ADD switch 100 is next closed which applied an A.-C. pulse at time $t_1$ for energizing electroluminescent cell 42 of first input network 11 and electrolumescent cell 90 of input carry network 18. The associated photoconductor elements 31 and 89 are triggered into their low impedance state and inputs are applied to input terminals 35 and 53 of logic network 12. Those elements 45 and 46 which are connected to input terminals 35 and 53, respectively, are energized providing an output along the diagonal conductor 47 connected to output terminal 66. This output will be recognized as indicative of a three with no carry. Accordingly, electroluminescent cell 82 of output network 13 corresponding to a three output is energized at a time $t_2$, shown in FIGURE 3. At time $t_3$ an A.-C. pulse from output 23 of clock timer 20 is applied to transfer the information from output network 13 to first register 15. Also at time $t_3$ the energizing A.-C. pulses to networks 11, 18 and 16 are cut-off. It is noted that during the period from $t_2$ to $t_3$ the appropriate photoconductor 83 of network 15, in this example the one corresponding to a three, is optically primed by the corresponding electroluminescent cell 82. Thus, the information is transferred to register 15 essentially instaneously in response to the energizing A.-C. pulse. At time $t_4$ the output in network 13 is terminated. At time $t_0'$ the information is shifted from register 15 to register 16 and input network 17 where it remains until a succeeding digit is entered in keyboard 10 and the next sequence of operations is initiated.

If it is assumed that an eight is to be added to the three registered in register 16, the eight is entered in keyboard 10 and ADD switch 100 is actuated at time $t_1'$. Inputs are applied to input terminals 40 and 56 of logic network 12 to provide an output along the diagonal 48 connected to output terminal 74. This is indicative of a one with a carry one or an eleven. Thus, the one electroluminescent cell 82 of output network 13 is energized at $t_2'$. In addition, electroluminescent cell 94 of carry network 13 is energized which in turn triggers photoconductor 95 into its low impedance state and generates a carry signal that is transmitted to the succeeding stage.

The one in output network 13 is transferred through the first register 15 to the second register 16 and input network 17 at times $t_3'$ and $t_0''$, respectively, according to the timing sequence of FIGURE 3, in the manner previously described. The addition process is repeated for subsequently applied inputs. For a substraction process it may be readily recognized that the operation is similar except that the SUBTRACT switch 101 is actuated for entering the minuend and subtrahend inputs into logic network 12.

In FIGURE 5 there is illustrated an alternative construction of the logic network 12. The same reference characters are employed as in FIGURE 4 for corresponding elements but with a B notation. The input terminals to logic network 12, of which terminals 38B through 41B are shown, are coupled to electroluminescent cells 45B as before. The second input terminals 53B through 56B being shown, are however connected to a plurality of photoconductor elements 52B which are arranged in the same manner as the previously described photoconductor elements 52A. Accordingly, the second input terminals are connected to the input electrodes of corresponding photoconductor elements 52B. The output electrodes of elements 52B which provide an output sum without a carry are connected in groups of equal valued outputs to diagonal conductors 47B. The output electrodes of elements 52B which provide an output sum with a carry are connected in groups of equal valued outputs to diagonal conductors 48B. In the instant embodiment, conductors 47B are connected to corresponding electroluminescent cells 82 of output network 13, as in the previously described embodiment. However, conductors 48B, rather than also being coupled to cells 82, are now connected to eight additional output electroluminescent cells 98 corresponding to outputs of zero to eight with a carry. Cells 98 are optically coupled to corresponding photoconductors 83 of register 15, and are each optically coupled to photoconductor 95 of network 14 for generating a carry signal. In the illustrated embodiment of FIGURE 5, only a single array of electroluminescent elements and a single array of photoconductor elements are required in logic network 12. The diagonal conductors 47B and 48B, which are coupled to the output electrodes of photoconductor elements 52B, cross the input connections and must be insulated therefrom. It is noted, also, that the continuous A.-C. energization to network 12 from output 25 of source 20 is not required in this embodiment.

In accordance with another construction of the network 12 employing two electroluminescent inputs and a pair of photoconductor elements at each crossover, as in FIGURE 4, the photoconductor elements may be located on the same side of a transparent substrate so as to satisfy the same optical coupling constraints as previously. This construction is otherwise similar to that in FIGURE 4.

It may be appreciated that a plurality of optoelectronic logic networks of the type that have been disclosed can be readily stacked in the fabrication of multistage computational devices. In addition, the various shift registers, input networks, output networks and carry networks may be readily integrated with the logic matrix boards. Specific fabrication of these networks may be in accordance with conventional practice and therefore are not illustrated.

Figure 6A:
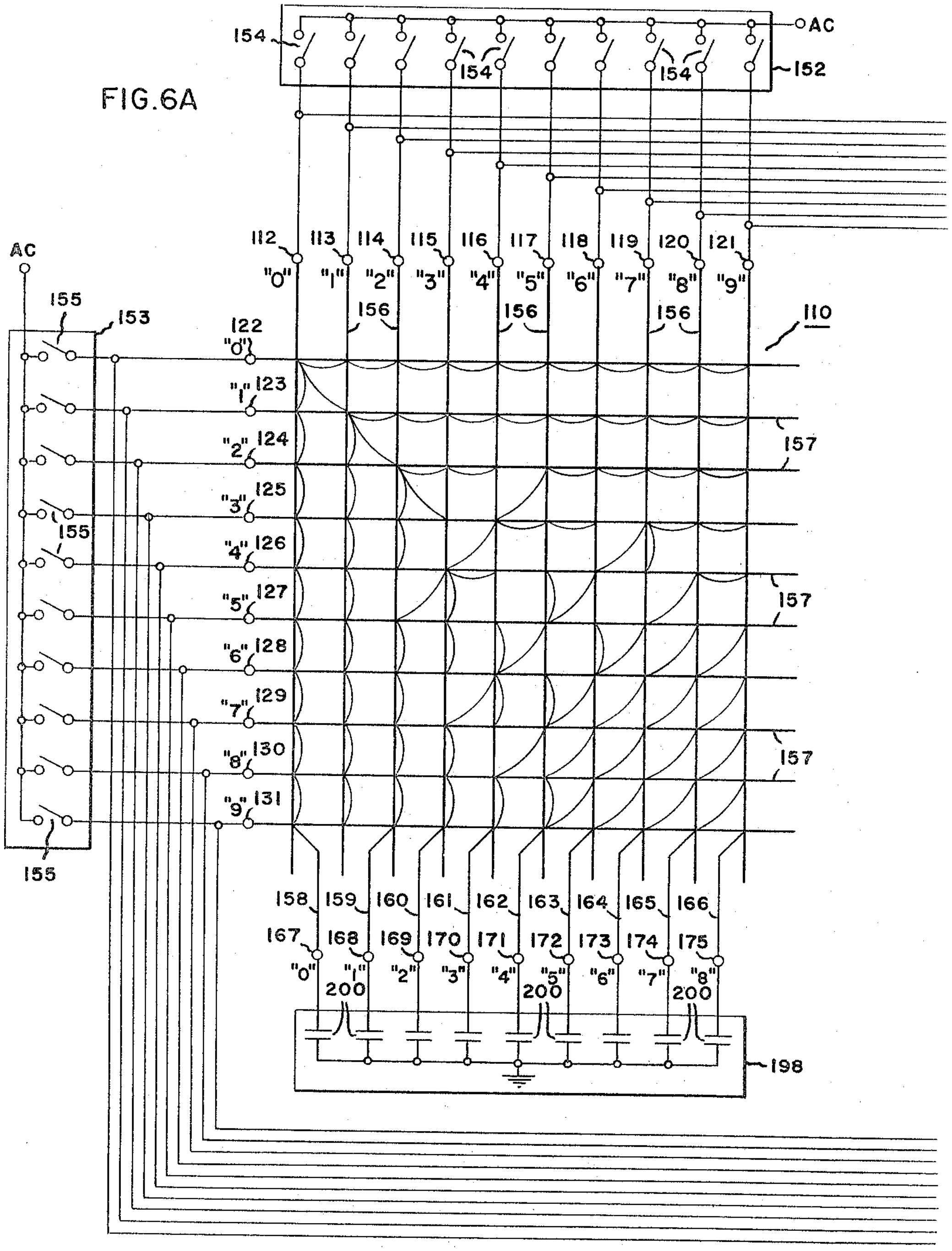
FIGURES 6A and 6B are schematic diagrams of an optoelectronic computational device in accordance with the invention for performing multiplication of single order decimal numbers.
Figure 6B:
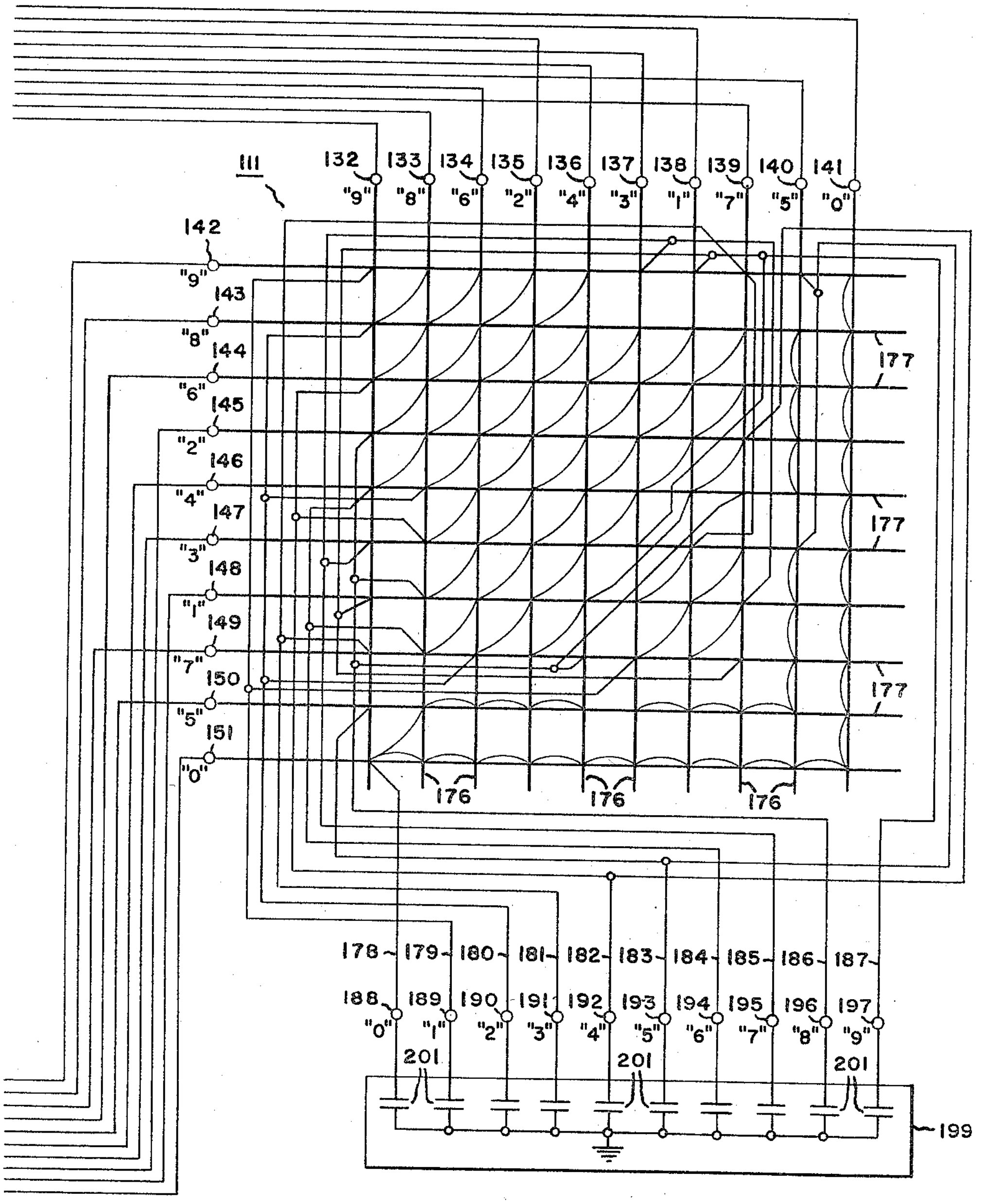

Referring now to FIGURES 6A and 6B there is schematically illustrated an optoelectronic computational device for performing multiplication of two single order numbers of the decimal system. As with respect to the addition-subtraction apparatus previously described, the device illustrated in FIGURES 6A and 6B is specifically directed to the decimal system, but with some slight modification of the logic matrices may be applicable to essentially any radix system. A first logic matrix 110 and a second logic matrix 111 are provided. To each matrix is coupled the numbers to be multiplied, which are entered as first and second input quantities, respectively. The output of matrix 110 provides the left-hand component of the derived product and the output of matrix 111 provides the right-hand component. Matrix 110 has a plurality of first input terminals 112, 113, 114, 115, 116, 117, 118, 119, 120 and 121 and a plurality of second input terminals 122, 123, 124, 125, 126, 127, 128, 129, 130 and 131, which first and second terminals correspond, respectively, to input digits zero to nine. Matrix 111 has a plurality of first input terminals 132, 133, 134, 135, 136, 137, 138, 139, 140 and 141 and a plurality of second input terminals 142, 143, 144, 145, 146, 147, 148, 149, 150 and 151 which correspond, respectively, to input digits nine, eight, six, two, four, three, one, seven, five and zero. The order of input terminals employed for logic network 111 has been found to provide an output pattern requiring the least complexity of output connections and which appreciably simplifies fabrication.

First and second keyboards 152 and 153 are provided which are similar to previously described keyboards 10. Keyboard 152 comprises a plurality of switches 154, each switch corresponding to a different value of input digits zero to nine, which are connected directly to corresponding first input terminals 112 to 121 and 132 to 141 of logic networks 110 and 111. Keyboard 153 includes a plurality of switches 155, each switch corresponding to a different value of input digits zero to nine, which are connected directly to corresponding second input terminals 122 to 131 and 142 to 151 of logic networks 110 and 111.

Logic network 110, similar to logic networks 12 of FIGURES 1 and 2, comprises a first array of nonintersecting elements 156 coupled to input terminals 112 to 121 and a second array of nonintersecting elements 157 coupled to input terminals 122 to 131, which elements cross over the elements of said first array. The crossover points are coupled to output conductors 158, 159, 160, 161, 162, 163, 164, 165 and 166 which connect together outputs of equal value. Conductors 158 to 166 are coupled to output terminals 167, 168, 169, 170, 171, 172, 173, 174 and 175, respectively, corresponding to output values of zero to eight.

Similarly logic network 111 comprises a first array of nonintersecting elements 176 coupled to input terminals 132 to 141 and a second array of nonintersecting elements 177 coupled to input terminals 142 to 151, which cross over elements 176. The crossover points are coupled to output conductors 178, 179, 180, 181, 182, 183, 184, 185, 186 and 187 which connect together outputs of equal value. Conductors 178 to 187 are coupled to output terminals 188, 189, 190, 191, 192, 193, 194, 195, 196 and 197, respectively, corresponding to output values of zero to nine.

The fabrication of logic networks 110 and 111 may take the same form as illustrated in FIGURES 4 and 5 except that the output conductors no longer all traverse solely diagonal paths connecting adjacent crossover points but are of a somewhat modified configuration which is necessary to connect together outputs of equal value.

Output networks 198 and 199 are provided for logic networks 110 and 111, respectively. Output network 198 includes a plurality of electroluminescent cells 200 to which are connected output terminals 167 to 175. Output network 199 comprises a plurality of electroluminescent cells 201 to which are connected output terminals 188 to 197. Accordingly, an indication of the output product may be obtained from output networks 198 and 199.

Consider now an exemplary operation of the multiplier device of FIGURES 6A and 6B where, for example, it is desired to obtain a product of six and seven. The switch 154 corresponding to a six is closed which applies energy to input terminals 118 and 134 of matrices 110 and 111, respectively, and the switch 155 corresponding to a seven is closed which applies energy to input terminals 129 and 149 of matrices 110 and 111, respectively. Accordingly, conductors 162 of matrix 110 and 180 of matrix 111 are energized and outputs appear at output terminals 171 to 190, indicative of a four and a two, respectively.

Where it is desired to multiply multi-order numbers a plurality of product logic networks and addition logic networks are employed in combination wherein the output terminals of the product logic networks are connected directly to corresponding input terminals of the addition logic networks so that output networks such as 198 and 199 of FIGURES 6A and 6B are required only at the final output.

Figure 7:
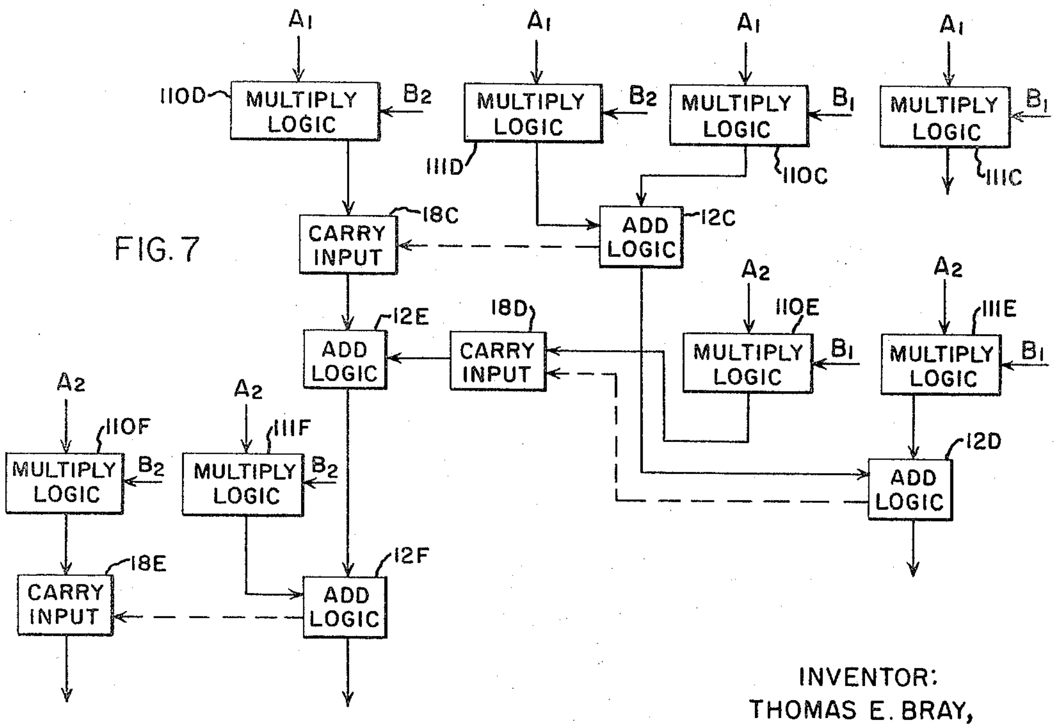
FIGURE 7 is a block diagram of an optoelectronic computational device for performing multiplication of multiorder decimal numbers.

A computational device for performing multiplication of two double order numbers of the decimal system $A_2A_1 \times B_2B_1$ is illustrated in block form in FIGURE 7. There are employed four pairs of product logic networks, 110C and 111C, 110D and 111D, 110E and 111E, and 110F and 111F, which are essentialy identical to the logic networks illustrated in FIGURES 6A and 6B. Further, only addition logic networks are required 12C, 12D, 12E and 12F and three input carry networks 18C, 18D and 18E which are essentially identical to the corresponding networks illustrated in FIGURE 2. The various networks are coupled together so as to provide the individual multiplication and addition steps that are performed when multiplying two double order numbers.

The first order of the first number $A_1$ is coupled to the first inputs of product networks 110C, 111C, 110D and 111D. The second order of the first number $A_2$ is coupled to the first inputs of product networks 110E, 111E, 110F and 111F. The first order of the second number $B_1$ is coupled to the second inputs of networks 110C, 111C, 110E and 111E, and the second order of the second number $B_2$ is coupled to the second inputs of networks 110D, 111D, 110F and 111F. The output of network 110C is connected to the first input of addition network 12C and the output of network 111D is connected to the second input of network 12C. The output of network 12C is connected to the second input of addition network 12D, to the first input of which is connected the output from network 111E. The output from network 110D is coupled through carry network 18C to the first input of addition network 12E. Network 18C is energized by network 12C. The output of network 110E is connected through carry network 18D to the second input of network 12E. Carry network 18D is energized by network 12D. The output from network 12E is coupled to the first input of addition network 12F to the second input of which is coupled the output of network 111F. Network 12F energizes carry network 18E through which is coupled the output from network 110F. The final product output is obtained from networks 111C, 12D, 12F and 18E which may be coupled to output networks as in FIGURES 6A and 6B. It is noted that the networks 12C to 12F and 18C to 18E in one exemplary mode of operation may be energized by a source of continuous A.-C. power.

It may be appreciated that the combination of the product logic networks addition logic networks and carry networks provides considerable flexibility in performing multiplication operations, and that in accordance with the principles described the various networks may be combined as required to provide multiplication of numbers having unlimited orders.

Although the devices of the present invention have been described with respect to a number of specific operable embodiments for the purpose of clear and complete disclosure, it is not intended that the invention be construed as limited thereto. It is recognized, therefore, that numerous modifications may occur to those skilled in the art which do not depart from the basic teachings set forth herein. Thus, the logic matrices need not be in the grid configuration described but can assume, for example, a circular arrangement. In such arrangement one set of separate input elements would form a plurality of open-ended concentric circles, the other set of input elements forming a plurality of spoke-like radii which intersect said circles. Output conductors may accordingly be in a spiral configuration connecting equal valued outputs.

In addition, the specific construction of the electroluminescent cells in the logic matrices may be otherwise than indicated. For example, in lieu of the strip arrangement described individual cells may be provided at each crossover, which cells are coupled together by electrical conductors to form a fabrication that is the functional equivalent of that described. Further, although the elements in each of the first and second arrays of the logic matrices are preferably nonintersecting for ease of fabrication, this is not a necessary constraint. What is required is that the elements of the first array intersect the elements of the second array at discrete crossover points so that each crossover is formed by only two intersecting elements, one from each array.

It should also be recognized that the delays required in the operation of the addition-subtraction devices, provided in the illustrated embodiments in the generation of delayed A.-C. energizing pulses, can be provided either entirely or partially by the finite response times of the photoconductor cells in the various networks.

The appended claims are intended to be construed as including all modifications that fall within the true spirit of the invention.

What I claim as new and desire to secure by Letters Patent of the United States is:

1. An optoelectronic computational device for performing mathematical operations with respect to numbers in a conventional radix system comprising:

(a) a logic matrix means having at least a first and second array of optoelectronic elements with the elements of each array each corresponding to a digit of said radix system, the elements of said first array being electroluminescent cells arranged in colums and the elements of said second array being electroluminescent cells arranged in rows so that the electroluminescent cells of said first array intersect the electroluminescent cells of said second array at a number of discrete crossover points, there being provided at each crossover point photoconductive means in optoelectrically coupled relationship with associating intersecting electroluminescent cells, (b) first input means for selectively applying a first input signal representing a given digit to a corresponding electroluminescent cell of said first array, (c) second input means for selectively applying a second input signal representing another given digit to a corresponding electroluminescent cell of said second array, the photoconductive means at the crossover point of said corresponding electroluminescent cells generating an output signal having an assigned value indicative of a combination of the applied input signals, and (d) output means for coupling in common output signals of equal assigned values.

2. An optoelectronic computational device for performing mathematical operations with respect to numbers in a conventional radix system of radix N comprising:

(a) a logic matrix having a first array of electroluminescent elements arranged in columns of parallel strips and a second array of electroluminescent elements arranged in rows of parallel strips which intersect said columns at discrete crossover points, (b) photoconductive means provided at each crossover point in an optically coupled relationship with associated intersecting electroluminescent elements, (c) first input means for selectively applying a first input signal representing a given digit to a corresponding element of said first array, (d) second input means for selectively applying a second input signal representing another given digit to a corresponding element of said second array, the crossover points of corresponding elements to which are applied input digits having sums of less than N each generating through their respective photoconductive means an output signal having an assigned value indicative of a completed sum of said input digits, the remaining crossover points of corresponding elements to which are applied input digits having sums of N or greater each generating through their photoconductive means an output signal having an assigned value of a partial sum of said input digits having sums of N or greater, (e) first output means for coupling in common output signals of equal assigned values indicative of a completed sum, and (f) second output means for coupling in common output signals of equal assigned values indicative of a partial sum.

3. An optoelectronic computational device as in claim 2 wherein coupled to said second output means there is provided means for generating a carry signal in response to the application of input digits having sums of N or greater.

4. An optoelectronic computational device as in claim 3 wherein said first and second output means are commonly connected to a plurality of electroluminescent cells which provide an indication of the output sum value.

5. An optoelectronic computational device for performing addition and subtraction operations with respect to multiorder numbers in a conventional radix system of radix N comprising:

(a) a plurality of logic matrices, one for each order of said multiorder numbers, said matrices each having a first and second array of optoelectronic elements with the elements of each array corresponding to a digit of said radix system, within each matrix the elements of said first array intersecting the elements of said second array at a number of discrete crossover points, (b) first input means for selectively applying first input signals representing the digits of a first multiorder number to corresponding elements of said first arrays during addition operations and for selectively applying first input signals representing the (N–1's) complement of said digits to corresponding elements during subtraction operations, (c) second input means for selectively applying second input signals representing the digits of a second multiorder number to corresponding elements of said sceond arrays in the absence of a carry signal and for selectively applying second input signals representing said second number digits advanced by one to corresponding elements of said second arrays in the presence of a carry signal, the crossover points of corresponding elements in each matrix to which are applied first and second input signals representing digits having sums of less than N each generating an output signal having an assigned value indicative of a completed sum of said first and second input signals, the remaining crossover points of corresponding elements in each matrix to which are applied first and second input signals representing digits having sums of N or greater each generating an output signal having an assigned value indicative of a partial sum of said first and second input signals having sums of N or greater, (d) first output means for coupling in common output signals of equal assigned values indicative of a completed sum, (e) second output means for coupling in common output signals of equal assigned values indicative of a partial sum, and (f) means, coupled to said second output means, for generating and transmitting between matrices a carry signal in response to the application of first and second input signals having sums of N or greater.

6. An optoelectronic computational device as in claim 5 wherein said elements are electroluminescent cells and wherein there is provided at each said crossover point photoconductive means in optically coupled relationship with associated intersecting electroluminescent cells, said output signals being generated through said photoconductive means in response to energization of said intersecting electroluminescent cells.

7. An optoelectronic computational device as in claim 5 wherein the elements of said first arrays are electroluminescent cells and the elements of said second arrays each include a plurality of photoconductive cells in optically coupled relationship with intersecting electroluminescent cells, said output signals being generated through said photoconductive cells in response to the application of said second input signals and the energization of said electroluminescent cells.

8. An optoelectronic computational device for performing multiplication operations with respect to numbers in a conventional radix system comprising:

(a) a first logic matrix having a first and second array of optoelectronic elements with the elements of each array each corresponding to a digit of said radix system, the elements of said first array intersecting the elements of said second array at a number of discrete crossover points, (b) a second logic matrix having a third and fourth array of optoelectronic elements with the elements of each array each corresponding to a digit of said radix system, the elements of said third array intersecting the elements of said fourth array at a number of discrete crossover points, (c) first input means for selectively applying a first input signal representing a given digit to corresponding elements of said first and third arrays, (d) second input means for selectively applying a second input signal representing another given digit to corresponding elements of said second and fourth arrays, the crossover point of corresponding elements of said first and second arrays generating a first output signal having an assigned value indicative of the left-hand component of the product of the input digits, the crossover point of corresponding elements of said third and fourth arrays generating a second output signal having an assigned value indicative of the right-hand component of said product, (e) first output means for coupling in common first output signals of equal assigned values, and (f) second output means for coupling in common second output signals of equal assigned values.

9. An optoelectronic computational device as in claim 8 wherein said elements are electroluminescent cells and wherein there is provided at each said crossover point photoconductive means in optically coupled relationship with associated intersecting electroluminescent cells, said output signals being generated through said photoconductive means in response to energization of said intersecting electroluminescent cells.

10. An optoelectronic computational device as in claim 8 wherein the elements of said first and third arrays are electroluminescent cells and the elements of said second and fourth arrays each include a plurality of photoconductive cells in optically coupled relationship with intersecting electroluminescent cells, said output signals being generated through said photoconductive cells in response to the application of said second input signal and the energization of said electroluminescent cells.

11. An optoelectronic computational device for performing addition and subtraction operations with respect to numbers in a conventional radix system comprising:

(a) a logic matrix means having a first and second array of optoelectronic elements with the elements of each array each corresponding to a digit of said radix system, the elements of said first array intersecting the elements of said second array at a number of discrete crossover points, (b) first input means for selectively applying a first input signal representing a given digit to a corresponding element of said first array, (c) second input means for selectively applying a second signal representing another given digit to a corresponding element of said second array, the crossover point of said corresponding elements generating an output signal having an assigned value indicative of a combination of the applied input signals, (d) output means for coupling in common output signals of equal assigned values, (e) storage means for receiving said output signals, and (f) means for coupling the stored signals in said storage means to one of said input means.

12. A multistage optoelectronic computational device for performing addition and subtraction operations with respect to numbers in a conventional radix system of radix N, each stage comprising:

(a) a logic matrix means having a first and second array of optoelectronic elements with the elements of each array each corresponding to a digit of said radix system, the elements of said first array intersecting the elements of said second array at a number of discrete crossover points, (b) first input means for selectively applying a first input signal representing a given digit to a corresponding element of said first array, (c) second input means for selectively applying a second input signal representing another given digit to a corresponding element of said second array, the crossover point of said corresponding elements generating an output signal having an assigned value indicative of a combination of the applied input signals, (d) output means for coupling in common output signals of equal assigned value, said output means including carry generating means for generating a carry signal in response to the application of input digits having sums of N or greater, and (e) means for coupling said carry signal to one of the input means of the next higher order stage.

13. A multistage optoelectronic computational device as in claim 12 wherein each stage includes a storage means for receiving said output signals and means for coupling the stored signals in said storage means to one of the input means of the same stage.

References Cited by the Examiner

UNITED STATES PATENTS

| | | | |
|---|---|---|---|
| 3,104,317 | 9/1963 | Cochrane | 235—164 |
| 3,125,681 | 3/1964 | Johnson | 250—213 |
| 3,138,704 | 6/1964 | Rice | 235—175 |
| 3,163,749 | 12/1964 | Roth | 235—164 |

OTHER REFERENCES

Greenberg, I: "Electroluminescent Display and Logic Devices," Electronics, March 24, 1961 (pp. 31–35).

MALCOLM A. MORRISON, *Primary Examiner.*

ROBERT C. BAILEY, *Examiner.*

K. MILDE, T. M. ZIMMER, *Assistant Examiner.*